No. 843,631. PATENTED FEB. 12, 1907.
F. A. RYTHER.
POWER ATTACHMENT FOR HAY BALERS.
APPLICATION FILED SEPT. 1, 1906.
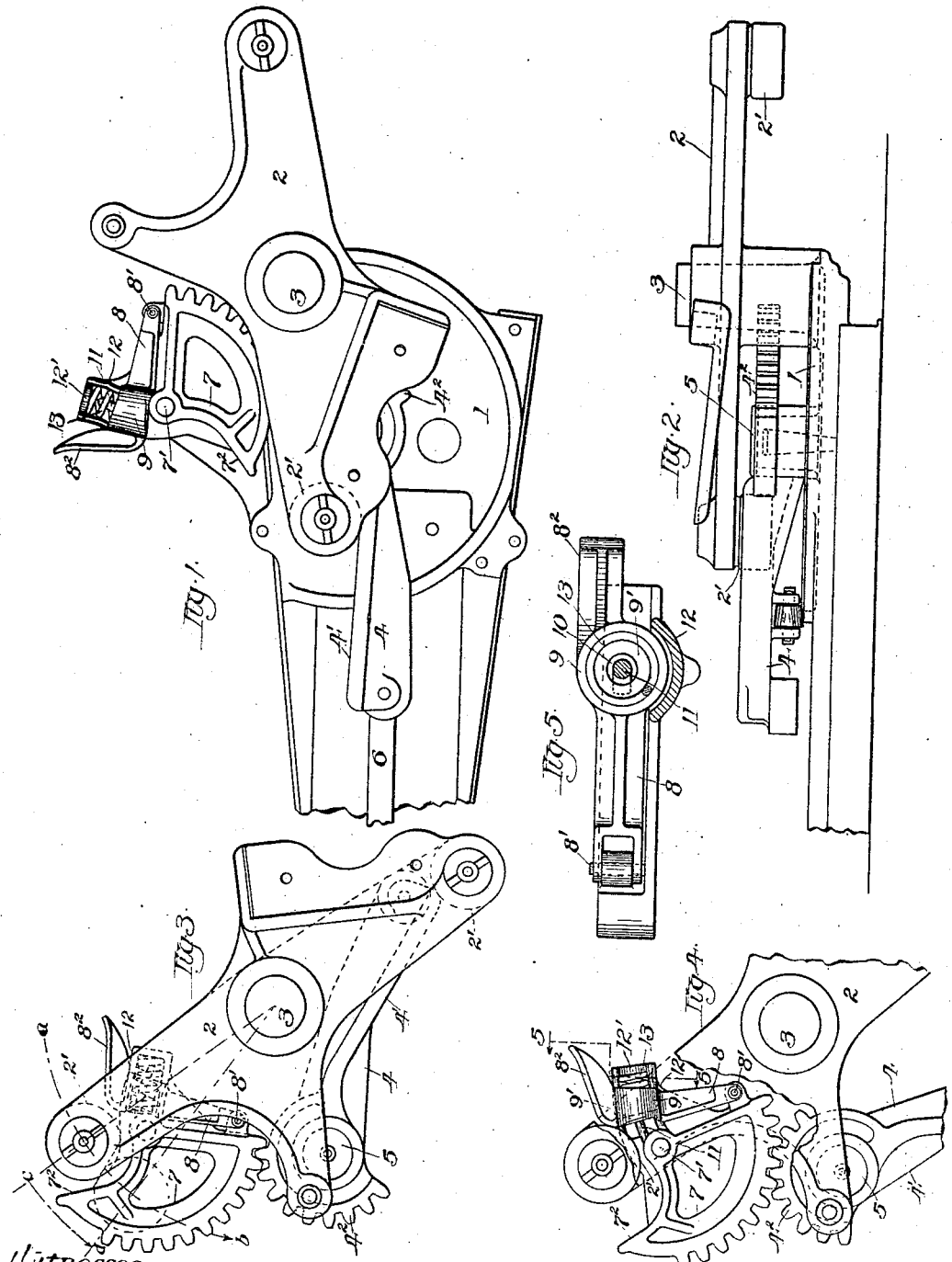

UNITED STATES PATENT OFFICE.

FRANK A. RYTHER, OF CHICAGO, ILLINOIS, ASSIGNOR TO THE INTERNATIONAL HARVESTER COMPANY, A CORPORATION OF NEW JERSEY.

POWER ATTACHMENT FOR HAY-BALERS.

No. 843,631.  Specification of Letters Patent.  Patented Feb. 12, 1907.

Application filed September 1, 1906. Serial No. 332,904.

*To all whom it may concern:*

Be it known that I, FRANK A. RYTHER, a citizen of the United States, residing at Chicago, in the county of Cook and State of Illinois, have invented a new and useful Improvement in Power Attachments for Hay-Balers, of which the following is a complete specification.

The present invention relates to an improvement in the power attachment of horse-power balers, and more particularly to means for relieving or absorbing the shock ordinarily imparted to the power members by the sudden return of the plunger due to the elasticity of the compressed charge.

The object of the invention is to relieve this shock, and thus remove the liability of breakage of the parts and prolong the life of the power. Furthermore, the construction of the power is simplified by combining the improved retarding device with the positive return mechanism of the power-arm.

In the accompanying drawings, Figure 1 represents a fragmentary plan view of a power attachment for balers, including the present improvement. Fig. 2 is a corresponding side elevation of same. Fig. 3 shows a plan view of the sweep-arm, the power-arm, and the yielding power-arm retarder, the power-arm being shown in the position it occupies just before it is released from the sweep-arm. Fig. 4 illustrates the relative position of the different parts after the roller on the sweep-arm has engaged the retarder. Fig. 5 represents a detail section of the retarding device, taken on the line 5 5 of Fig. 4.

The invention consists, essentially, in mounting a retarding device on the frame of the machine, preferably in connection with the positive return for the plunger, in such a manner that said device will act to retard the quick return movement of the plunger, and thus absorb the shock of same.

Referring to the accompanying drawings, 1 designates the frame of the power, and 2 the sweep-arm pivotally mounted thereon, the pivotal axis being formed by the large pin 3. On the frame 1 is also mounted the power-arm 4, eccentric with respect to pivotal axis of the power-arm and with its axis on the pin 5. The free end of this arm connects with the plunger draw-bar 6. The rollers 2' on the sweep 2 are adapted to engage the cam-surface 4' of the power-arm 4, and this power-arm is also provided with a toothed segment $4^2$. The sweep-lever on the sweep-arm 2 is not shown, since it is not essential to a clear understanding of the improvement. On the frame or base 1 of the power attachment is also pivotally mounted at 7' the segment-gear 7, which meshes with the toothed segment $4^2$ of the power-arm 4. The segment-gear 7 is provided with a cam-surface $7^2$, which lies in the path of travel of the rollers 2' on the sweep-arm 2 when the power-arm 4 occupies a position at or near the outer end of its stroke, as shown in either Figs. 3 or 4. The arc *a b* represents a portion of the path of travel of the rollers 2', and it will be seen that this arc intersects the cam-surface $7^2$ and that the pivotal point 7' of the segment-gear lies within said path.

From an inspection of Fig. 3 it will be seen that the power-arm 4 is at the forward end of its stroke and that further movement of the sweep-arm 2 will release the driving-roller 2' from said power-arm. If the elasticity of the compressed charge is not sufficient to return the power-arm to its initial position, as shown in Fig 1, the roller 2' will engage the cam-surface $7^2$, rotating the segment-gear 7, and in consequence the power-arm 4 will by a comparatively short movement of the sweep-arm be positively returned from the position shown in Fig. 3 to that shown in Fig. 1. In the event, however, that the plunger returns too precipitately, as is frequently the case, thus resulting in a severe shock to the power members, means for retarding the return of the power-arm are required. Such means are provided in the retarding-lever 8, which is pivotally mounted at 8' on the segment-gear 7. The retarding-lever terminates at its free end in the roller-engaging flange $8^2$, arranged to lie in the path of the roller 2' when the power-arm is at the forward end of its stroke. A hollow cylindrical cup 9, open at the top, is formed near the free end of the lever 8 and preferably integral therewith, this cup having a bottom 9', in which is an aperture 10, through which projects the lug 11, extending from the segment-gear 7. In this cylindrical cup is placed a spring 13, reacting between the bottom 9' in the cup 9 and a cap-like extension 12' on the support 12. This support 12 extends out from the segment-gear 7, and hence is fixed relative to the free end of the retarding-lever 8. The effect of the spring 13 is to hold the retarding-lever 8 yielding against the segment-gear 7, and thus constitute a yielding and prolonged contact between the sweep-arm and power-lever after normal engagement therebetween has ceased.

In order to permit the lever 8 to swing upon its pivotal center 8', the cylindrical cap 9, the support 12, and lug 11 are of arcuate form, with the center of curvature coincident with the pivotal center of the said lever.

The operation of the retarder is shown in Figs. 3 and 4. In the first of these figures the retarding-lever has not yet engaged the roller 2', as the power-arm has not disengaged from the opposite roller 2'. In Fig. 4, however, the lever 4 has been released and the retarding-lever 8 has been thrown in contact with the roller by said arm through the toothed segment 4² rocking the segment-gear 7 and with it the lever 8. As soon as contact between the roller and flange 8² of the lever 8 occurs the said lever will yield, compressing the spring 13 and operating to advance the sweep-arm 2. This contact will continue until the power-arm has returned to its original position, (shown in Fig. 1,) the retarding-lever 8 and segment-gear 7 then occupying the positions shown in the same figure. During this movement the sweep-arm 2 will advance the comparatively small angular distance indicated by the arc $c\,d$, representing, perhaps, three or four feet at the end of the sweep-lever, and absorbing the shock due to the plunger's rebound while passing over this distance.

It will be understood, of course, that the retarding-lever 8 might be constructed and operated independent of the positive-return device, but for simplicity and economy it is found best to combine the two.

What I claim as my invention, and desire to secure by Letters Patent, is—

1. In a power attachment for hay-balers, in combination, a power-frame, a sweep-arm, a power-arm eccentrically mounted with respect to said sweep-arm, contact-points on each of said arms, and a retarding-lever pivotally mounted on said frame and operatively connected to said power-arm, said lever arranged to be engaged by the contact-point on the sweep-arm after normal engagement between the contact-points on the sweep and power arms has ceased.

2. In a power attachment for hay-balers, in combination, a power-frame, a sweep-arm, a power-arm eccentrically mounted with respect to the sweep-arm, contact-points on each of said arms, and a yieldingly-held retarding-lever pivotally mounted on said frame and operatively connected to said power-arm, said lever arranged to be engaged by the contact-point on the sweep-arm after normal engagement between the contact-points on the sweep and power arms has ceased.

3. In a power attachment for hay-balers, in combination, a power-frame, a sweep-arm, a power-arm eccentrically mounted with respect to the sweep-arm, contact-points on each of said arms, and pivotally-mounted means operatively connected to said power-arm for either positively returning the plunger-arm or for retarding same in its return, said means arranged to be engaged by the contact-point on the sweep-arm after normal engagement between the contact-points on the sweep and power arms has ceased.

4. In a power attachment for hay-balers, in combination, a power-frame, a sweep-arm, a power-arm eccentrically mounted with respect to the sweep-arm, contact-points on each of said arms, and means pivotally mounted on said frame and provided with a rigid and a yielding point of engagement, the said means having an operative connection with the power-arm, and the said points of engagement thereof arranged to be engaged by the contact-point on the sweep-arm after normal engagement between the contact-points on the sweep and power arms has ceased.

5. In a power attachment for hay-balers, in combination, a power-frame, a sweep-arm, a power-arm eccentrically mounted with respect to the sweep-arm and provided with a toothed segment, contact-points on each of said arms, a gear-segment pivotally mounted on the said frame and meshing with said toothed segment on the power-arm, a point of engagement on said segment adapted to be engaged by the contact-point on the sweep-arm and positively return the power-arm, a retarding-lever pivotally mounted upon and yieldingly held against said gear-segment, said retarding-lever arranged to be engaged by the contact-point on the sweep-arm after normal engagement between the contact-points on the sweep and power arms has ceased.

FRANK A. RYTHER.

Witnesses:
 OTTO H. AHLERS,
 OSCAR A. ANDERSON.